United States Patent [19]

Bhatia

[11] 4,169,185

[45] Sep. 25, 1979

[54] GASKET FOR HIGH TEMPERATURE APPLICATION HAVING SEALANT OF PHENYL AND HYDROCARBYL-SUBSTITUTED POLYSILOXANE

[75] Inventor: Yog R. Bhatia, Glen Ellyn, Ill.

[73] Assignee: Dana Corporation, Toledo, Ohio

[21] Appl. No.: 921,485

[22] Filed: Jul. 3, 1978

[51] Int. Cl.$^2$ .................. B32B 5/16; B65D 53/00
[52] U.S. Cl. ...................... 428/328; 277/235 A; 277/235 B; 277/DIG. 6; 427/387; 427/383 C; 427/374 R; 428/405; 428/447; 428/450; 428/480; 428/482
[58] Field of Search ......... 277/235 A, 235 B, DIG. 6; 428/450, 328, 405, 480, 482, 447; 427/387, 383 C, 374 R

[56] References Cited

U.S. PATENT DOCUMENTS

| | | | |
|---|---|---|---|
| 2,289,620 | 7/1942 | Bernstein | 277/235 B |
| 2,605,194 | 7/1952 | Smith | 428/447 |
| 2,695,186 | 12/1954 | Balfe | 277/235 B |
| 2,891,879 | 6/1959 | Rohrer | 428/450 |
| 3,305,504 | 2/1967 | Huntington | 428/450 |
| 3,505,099 | 4/1970 | Neuroth | 428/461 |
| 3,560,244 | 2/1971 | Neuroth | 428/447 |
| 3,667,993 | 6/1972 | Stevenson | 428/450 |
| 3,926,539 | 12/1975 | Lamm | 277/235 B |
| 4,042,747 | 8/1977 | Breton | 428/328 |

OTHER PUBLICATIONS

*Encyclo. Polymer Science and Tech.*, vol. 12, p. 464 and pp. 531–552, John Wiley, 1970.

*Primary Examiner*—Ellis P. Robinson
*Attorney, Agent, or Firm*—Wilson, Fraser & Clemens

[57] ABSTRACT

A gasket and a process for preparing it are disclosed characterized in that the gasket is especially adapted for high temperature application, for example, in the range of about 1200° F. to about 1600° F. The gasket comprises a metallic base sheet having a sealant coating comprising a flexible, heat-cured, phenyl-substituted, hydrocarbyl-substituted polysiloxane resin containing metallic powder, such as aluminum powder, dispersed therein. Preferably, the polysiloxane resin contains at least 10 mole percent of the phenyl radical and may include in admixture an alkyd resin to assist in imparting flexibility.

25 Claims, No Drawings

GASKET FOR HIGH TEMPERATURE APPLICATION HAVING SEALANT OF PHENYL AND HYDROCARBYL-SUBSTITUTED POLYSILOXANE

BACKGROUND OF THE INVENTION

Gaskets are often used to provide a fluid type seal between two engaging, contronting, or mating parts. A common example includes pipes or similar conduit having machined flanges which are butted together over a gasket, the gasket having a large central opening matching that of the interior of the pipes as well as much smaller peripheral holes registering with like holes in the flanges jointly to receive bolts or the like to secure the assembly together. Another common example is that of a cylinder head gasket for internal combustion engines which is held under compression between a cylinder block and a cylinder head and insures against leakage of fluids like water.

In general, gasket materials comprise a base sheet of uniform thickness which may be of metal or of a fibrous composition, held together by a suitable bonding agent, and a deformable elastomer coat or bead which may cover all or only selected areas of the sheet. In use, the coat or bead deforms or spreads under pressure of forcing together the parts between which the gasket material lies and aids in realizing a desired fluid-type seal between the parts.

At present, gaskets designed to function at high temperatures are manufactured from two or three ply laminates consisting of one or two metal sheets and one to three asbestos sheets. However, these laminates are expensive to manufacture and require excessive labor and material. Also, the use of asbestos has become increasingly regarded as toxic and unsafe to handle.

Normally, high temperatue application makes severe demands on gaskets. Many gasketing materials are simply unable to meet such demands, and those which are tentatively able to do so have quite brief useful lives.

U.S. Pat. No. 2,605,194 to Smith describes preparation of a paint including a resin composed of siloxane structural units which is pigmented with powdered aluminum and air dried to a non-tacky state.

U.S. Pat. No. 3,505,099 and U.S. Pat. No. 3,560,244, both to Neuroth, disclose methods for bonding a curable silicone rubber or a polysiloxane to a substrate, characterized in that a zinc dust primer composition is first applied to the substrate. Subsequently, a silane or an organopolysiloxane is used to coat the primer composition after which a curable silicone rubber or an organopolysiloxane is applied.

SUMMARY OF THE INVENTION

A primary object is to provide an improved flexible, asbestos-free gasket which is designed to be operative and function as an effective seal at relatively high temperatures of service, for example, at temperatures up to 1600° F. for short term and at temperatures of about 1200° F. continuously. A related object is to provide a process for preparing the gasket that is relatively inexpensive, involves simpler techniques of fabrication, and requires less labor and material while specifically avoiding the use of asbestos.

In one form, the present gasket comprises a metallic base sheet having a flexible sealant coating on one or both sides which is expecially constituted to withstand the relatively high temperatures of application that are contemplated. The coating includes a class of polysiloxane resins, preferably cross-linked, comprising a flexible, heat-cured phenyl-substituted, hydrocarbyl-substituted polysiloxane resin and contains metallic particles such as those of aluminum. Preferably, the polysiloxane resin has at least 10 mole percent of the phenyl radical. It is important that the polysiloxane resin be of the heat-cured type and not of the room-temperature-vulcanizable type. As a modification, the polysiloxane resin may contain in admixture a sufficient amount of an alkyd resin to aid in imparting the flexibility sought.

A process for preparing the gasket includes dissolving the partially cured polysiloxane resin in a suitable solvent, such as xylene, which contains as well the metallic powder in suspension, and then coating a base sheet with the resulting composition. Heating the assembly removes the solvent and completes the cure of the polysiloxane resin while encapsulating the metallic powder therein.

BRIEF DESCRIPTION OF THE PREFERRED EMBODIMENTS

The present gasketing material is adapted for high temperature use in service because of the composition of its component parts which, in combination, can withstand exposure to temperatures within the range of about 1200° F. to about 1600° F. while still providing an effective seal.

The gasket comprises a metallic base sheet and a sealant coating on the base sheet comprising a flexible, heat-cured, phenyl-substituted, hydrocarbyl-substituted polysiloxane resin containing metallic powder dispersed therein.

The metallic base sheet may be formed from any suitable metal, such as stainless steel, tin, or copper, but is preferably fabricated from cold rolled sheet steel. Like the polysiloxane coating, the base sheet should be flexible, and, for this purpose, may range from about 10 mils to about 25 mils in thickness, although these values are not critical. A usual thickness is about 15 mils. Suitable openings may be provided in the base sheet as may be desired.

In order to meet the severe heat requirements of the present gasket, the polysiloxane resins used must be limited to heat-cured, phenyl-substituted, hydrocarbyl-substituted polysiloxanes which are flexible when fully cured as a coat or film. It is necessary to use heat-cured or heat-polymerized resins rather than those polysiloxanes which are termed RTV resins, that is, room-temperature-vulcanizable resins. This type of polysiloxane cross-links at room temperature through the addition of a catalyst or by moisture in the air. The RTV resins cannot withstand the heat exposure contemplated by the present gaskets. They tend to depolymerize and return to a liquid state or otherwise degrade at elevated temperatures.

This lack of heat-resistant properties of the RTV polysiloxane resins may be due, at least in part, to the fact that such resins cross-link at the ends of the polymeric chains where the reactive groups may be hydroxyl or vinyl groups. As hereinafter described, the present polysiloxane resins cross-link at sites intermediate the ends of the polymeric chains which is believed to lead to a stronger, larger, three-dimensional molecular network.

The presence of the phenyl radical is important to both the flexibility and high temperature resistance of the present polysiloxane resins. As a rule, the polysiloxane resins should contain at least about 10 mole percent of the phenyl radical.

Processes for preparing the present polysiloxanes are known in the art. In general, an alkyl chloride, such as methyl chloride, reacts under catalysis with silicon metal to form a family of organochlorosilanes. Hydrolysis of the organochlorosilanes can lead to the polysiloxanes.

While the polysiloxane resins useful in the invention may be linear, branched, or cyclic; cured by condensation or addition polymerization with cross-linking to a three dimensional network; one class of particularly useful phenyl-substituted, hydrocarbyl-substituted polysiloxane resins has the formula:

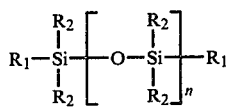

(1)

in which $R_1$ may be the same or different and is methyl, ethyl, propyl, isopropyl, vinyl, allyl, or hydroxyl, $R_2$ may be the same or different and is methyl, ethyl, propyl, isopropyl, or phenyl, provided that there is at least one phenyl radical per

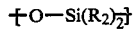

group, and n is a whole number sufficiently high to result in a solid state.

In general, n may vary from 10 to as much as 2500 or more, including the final polymerized state of the polysiloxane when it is cross-linked in a three dimensional network structure. Molecular weights of the cross-link polysiloxane may vary, as an example, from about 250,000 to about 700,000.

In the preferred practice, the pendant $R_2$ substituents comprise about 50 mole percent alkyl and about 50 mole percent phenyl The preferred alkyl substituent for $R_2$ is methyl.

The manner of curing or polymerizing the polysiloxane resin is known in the art. The polymerization embodies largely cross-linking of the polymeric chains as represented in Formula 1, although some chain extension can occur. As a rule, catalysts such as peroxides are incorporated with the polysiloxane and upon exposure to heat generate free radicals which activate the alkyl ($R_2$) groups by hydrogen removal, such that the residue alkylene radicals define active sites for cross-linking. For example, two methyl groups of two different polymer chains may be so activated to form an ethylene cross-link. Where the $R_1$ substituents are unsaturated, as in vinyl cross-linking can occur here as well due to the unsaturation of such groups.

It is this situs of the cross-linking activity away from the ends of the polymeric chains which leads to considerably more cross-linking than is the case when the polymeric chains cross-link only at their ends. The increased amount of cross-linking between the chains is, in turn, thought to contribute appreciably to the heat resistance of the present heat-cured polysiloxane resins.

The peroxide catalyst is used in an amount of about 0.05 percent to about 2 percent by weight of the resin and can comprise t-butyl perbenzoate which is stable in the polysiloxane compositions at room temperatures but rapidly decomposes at about 300° F. Other peroxide catalysts which can be used include benzoyl peroxide, phthalic peroxide, chlorobenzoyl peroxide, acetyl benzoyl peroxide, cyclohexyl hydroperoxide, diacetyl peroxide, and the like. However, cross-linking can be achieved by other than peroxide catalysis, such as by zinc metal which may be used in an amount of about 0.5 percent by weight based on the weight of the polysiloxanes, Metal salts of carboxylic acids, such as cobalt octoate, may be similarly used.

The gasket of the present invention should be flexible in order best to adapt it for a variety of mechanical applications and to increase its useful life. The use of the described polysiloxane resins alone suffices for most uses. In fact, flexibility of the polysiloxane coating can be varied by changing the mole ratio of the alkyl to phenyl $R_2$ substituents of Formula 1, such as from about 1 to about 10.

If, however, a further increase in flexibility is desired, this may be achieved by incorporating an alkyd resin with the polysiloxane resin. Alkyd resins are known in the art and comprise, for example, those formed by interacting unsaturated carboxylic acids (or anhydrides thereof) having, for example, from about 10 to about 21 carbon atoms and an diol having 2 to about 6 carbon atoms or a triol like glycerin. The alkyd resins may be modified with fatty acids, like linoleic acid, lauric acid, etc. When an alkyd resin is used, it may be admixed in the form of solution in an aromatic hydrocarbon solvent like xylene with the polysiloxane resin in an amount of about 5% to about 50% by weight of the polysiloxanes. The alkyd may be completely reacted at this time or subject to further reaction which occurs at the time the polysiloxane further polymerizes after application to the base sheet of the gasket.

Metals used to prepare the metallic powders are desirably aluminum and zinc. The metals are conventionally pulverized to form powder which, for example, may have an average particle size of about 20 microns to about 70 microns and preferably from about 30 microns to 50 microns. The heat resistance of the polysiloxane coating improves by incorporating any amount of metallic powder into the resin. Usually, the resin contains from about 5% to about 50% by weight of the metallic powder, although neither the stated particle size nor metal loading of the polysiloxane resin is critical. However, a greater powder loading than about 50% of metal powder may cause some of it to flake away from the gasket. Zinc provides a more abrasive finish than aluminum and also tends to gasify at very high temperatures, presumably reacting with moisture to provide hydrogen gas. Accordingly, aluminum is preferred for gasketing materials exposed to very high temperatures of about 1400° F. to about 1600° F.

To prepare the present gasket, a solution of the polysiloxane or mixture of polysiloxanes is prepared and then coated upon the metal base sheet. The solvent employed may comprise one of a number of organic liquids having a suitable solvating effect on the polysiloxane such as xylene, tolune, benzene, the various ketones such as acetone, methyl ethyl ketone, ethyl butyl ketone, and the like. The polysiloxane dissolved in the solvent is capable of further polymerization and especially cross-linking. The polysiloxane may be fluid at room temperatures, but normally n of Formula 1 is sufficiently high that the polysiloxane is in a solid state at room temperatures. The amount of polysiloxane dissolved is not critical, since the solvent is removed after application to the base sheet as by evaporation. But usually enough polysiloxane is present to deposit from a single application a coat or film having a thickness of about 0.3 mils to about 10 mils.

The solvent may also contain the catalyst for furthering polymerization as well as the metal particles which are dispersed or suspended in the organic solvent. It is understood that the solvent may contain still other ingredients such as reinforcing fillers like the silicas such as diatomaceous earth and crushed quartz, inorganic pigments such as titania, and still other additives, all of which can withstand the high temperatures contemplated for the gasket when in service. Organic compounds which are removed or destroyed when the coated base sheet is heated, such as dispersants, surfactants, etc., may also be present in the solvent.

The solvent and its components may be applied to a base sheet by any suitable means on one or both sides of the sheet and as a cover-all coating or in a selected continuous or discontinuous pattern. For example, the polysiloxane solution may be applied by dipping, roller coating, brushing, spraying, doctor knife, stenciling, and the like. Thereafter, the base sheet and solvent coating are heated relatively slowly at first to drive off the solvent and other volatiles and then at higher temperatures for a time to complete the polymerization of the polysiloxane resin. As a rule, the heat-cure may take place at about 350° F. to about 600° F. for about 0.1 hour to about 2.5 hours.

The following examples are intended only to illustrate the invention and should not be construed as imposing limitation on the claims. Percentages are by weight unless otherwise indicated.

EXAMPLE 1

The following composition was prepared for test by mixing the indicated components with a mechanically driven mixer for one hour. The components were added in the order listed, preferably waiting for a uniform mix before the next component was added.

| | | |
|---|---|---|
| Aluminum paste containing 66% aluminum powder in xylene | 45 | grams |
| Xylene | 12.5 | grams |
| Methyl phenyl polysiloxane, 50% solution in xylene | 100 | grams |
| Cobalt Octoate solution in xylene containing 6% cobalt | 0.85 | grams |
| Ferric Octoate solution in xylene containing 6% iron | 0.1 | grams |
| Toluene | 100 | grams |

Gaskets for a Cummins engine were prepared from 0.020 inch thick stainless steel sheets as the base sheet. The sheets were coated with the composition by dipping, dried in air for 5 minutes, and then baked for 15 minutes at 400° F. The coated gaskets sealed exhaust gases from the engine for 200 hours. Diesel fuel was used to operate the engine. The temperature of exhaust gases was 1200° F. to 1600° F. The coating thickness on the gaskets was 0.5 mil to 1 mil. Average particle size of the aluminum powders was 40 microns. Another lot of gaskets prepared in the same manner was heated in an oven at 1200° F. for 48 hours. The coatings did not burn or peel off.

The pencil hardness of the coating was H, and there was no failure when bent around a mandrel having a diameter of ⅛ inch.

EXAMPLE 2

The following composition was prepared by mixing the indicated components with a mechanically driven mixer for one hour. The components were added in the order listed, preferably waiting for a uniform mix before the next component was added.

| | | |
|---|---|---|
| Aluminum paste containing 66% aluminum powder in xylene | 60 | grams |
| Xylene | 10 | grams |
| Methyl phenyl polysiloxane, 50% solution in xylene | 200 | grams |
| Cobalt Octoate solution in xylene containing 6% cobalt | 1.7 | grams |
| Ferric Octoate solution in xylene containing 6% iron | 0.2 | grams |
| Xylene | 120 | grams |

Gaskets for sealing the intake manifold exhaust of an Oldsmobile diesel engine were fabricated from 0.015 inch thick sheet steel. These were phosphated and then contacted with the above composition by spray application. The coated gaskets were baked for 15 minutes at 400° F. and then tested on the engine. The gaskets functioned satisfactorily for 200 hours in the engine. The temperature at the intake manifold exhaust was about 1200° F. The film thickness of the coating was 0.5 mil to 1.5 mil. The particle size of aluminum used ranged from 20 to 70 microns. Another gasket in the same manner was heated for 24 hours at 1200° F. The coating did not burn or peel off. There was no failure when the coating was bent around ⅛ inch diameter mandrel. This example illustrates that gaskets made from steel sheets coated with the above composition function satisfactorily at about 1200° F.

EXAMPLES 3 AND 4

The following compositions were prepared by mixing the indicated components in grams with a mechanically driven stirrer for two hours, The components were added in the order listed, preferably waiting for a uniform mix before the next component was added.

| | Example | |
|---|---|---|
| | 3 | 4 |
| Aluminum paste containing 66% aluminum powder in xylene | 22 | 22 |
| Xylene | 6 | 6 |
| 50% solution of ethylphenyl polysiloxane in xylene | 37 | 43 |
| 50% solution of alkyd modified with linseed oil fatty acids in xylene | 12 | 6 |
| Cobalt Octoate solution in xylene containing 6% cobalt | 0.4 | 0.4 |
| Ferric Octoate solution in xylene containing 6% iron | 0.05 | 0.05 |
| Xylene | 10 | 10 |

The above compositions were applied on phosphated steel sheets, baked one hour at 400° F. and heated at 1200° F. for one hour. The coatings did not burn or peel off.

EXAMPLES 5, 6 AND 7

The following compositions were prepared by mixing the indicated components in grams with a mechanically driven stirrer for one hour. The components were added in the order listed, preferably waiting for a uniform mix before the next component was added.

|  | Example | | |
|---|---|---|---|
|  | 5 | 6 | 7 |
| 50% methylphenyl polysiloxane in xylene | 50 | 50 | 50 |
| Zinc dust | 25 | 20 | 20 |
| Graphite powder | — | 5 | 2 |
| Zinc oxide | — | — | 2 |
| Xylene | 20 | 20 | 20 |

Phosphated steel sheets were coated with the above compositions. The panels were baked for one hour at 500° F. and then heated for one hour at 1200° F. The coatings did not burn or peel off.

EXAMPLES 8 AND 9

The following compositions were prepared by mixing the indicated components in grams with a mechanically driven mixer for one hour. The components were added in the order listed, preferably waiting from a uniform mix before the next component was added.

|  | Example | |
|---|---|---|
|  | 8 | 9 |
| Aluminum paste containing 66% aluminum powder in xylene | 22 | 14 |
| Xylene | 6 | 6 |
| 50% methylphenyl polysiloxane in xylene | 50 | 50 |
| Xylene | 10 | 10 |

Phosphated steel sheets were coated with the above compositions and baked for two hours at 400° F. The coating did not char or peel off after heat aging for one hour at 1200° F.

EXAMPLES 10, 11 AND 12

The following compositions were prepared by mixing the indicated components in grams with a mechanically driven stirrer for one hour. The components were added in the order listed, preferably waiting for a uniform mix before the next component was added.

|  | Example | | |
|---|---|---|---|
|  | 10 | 11 | 12 |
| Aluminum paste containing 66% aluminum powder in xylene | — | 5 | 30 |
| Xylene | 5 | 5 | 5 |
| 50% methylphenyl polysiloxane | 50 | 50 | 50 |
| Cobalt Octoate solution in xylene containing 6% cobalt | 0.4 | 0.4 | 0.4 |
| Ferric Octoate solution in xylene containing 6% iron | 0.05 | 0.05 | 0.05 |
| Xylene | 10 | 10 | 10 |

Phosphated steel sheets were coated with the above compositions and baked for one hour at 400° F. These panels were then heated for one hour at 1200° F. The panel of Example 10 charred, but the panels of Examples 11 and 12 did not.

These examples show the need for metal powder for the gasket to withstand temperatures of at least 1200° F. although the amount of powder present can vary substantially.

Although the foregoing describes presently preferred embodiments of the present invention, it is understood that the invention may be practiced in still other forms within the scope of the following claims.

I claim:

1. A flexible asbestos free gasket adapted for high temperature application comprising a metallic base sheet and a sealant coating on the base sheet, said coating comprising a flexible, heat-cured, phenyl-substituted, hydrocarbyl-substituted, polysiloxane resin containing metallic powder dispersed therein, said polysiloxane resin containing at least 10 mole percent of the phenyl radical and being cross-linked at least at some of said hydrocarbyl-substituents, said resin containing from about 5% to about 50% by weight of the metallic powder, and the powder having an average particle size of about 20 microns to about 70 microns.

2. The gasket of claim 1 in which said base sheet is sheet steel.

3. The gasket of claim 1 in which the $R_2$ substituents are methyl and phenyl, and the mole ratio of methyl to phenyl varies from about 1 to about 10.

4. The gasket of claim 1 in which said polysiloxane resin contains in admixture a sufficient amount of an alkyd resin to aid in imparting said flexibility.

5. The gasket of claim 1 in which said polysiloxane resin contains in admixture about 5% to about 50% by weight of an alkyd resin to assist in imparting said flexibility.

6. The gasket of claim 1 in which the metal of said metallic powder is selected from the group consisting of aluminum and zinc.

7. The gasket of claim 1 in which said metal powder is aluminum.

8. The gasket of claim 1 in which said base sheet is stainless steel.

9. The gasket of claim 1 in which said phenyl-substituted, hydrocarbyl-substituted polysiloxane resin is formed by cross-linking a polymer having the formula:

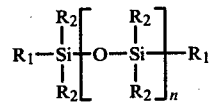

in which $R_1$ may be the same or different and is methyl, ethyl, propyl, isopropyl, vinyl, allyl, or hydroxyl, $R_2$ may be the same or different and is methyl, ethyl, propyl, isopropyl, or phenyl, provided that there is at least one phenyl radical per

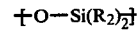

group, the non-phenyl $R_2$ sububstituents defining potential cross-linking sites, and n is a whole number sufficiently high to result in a solid state.

10. The gasket of claim 9 in which said $R_2$ substituents comprise about 50 mole percent alkyl and about 50 mole percent phenyl.

11. The gasket of claim 9 in which n varies from about 10 to about 2500.

12. The gasket of claim 9 in which the cross-linked polymer formed from said formula has a molecular weight of about 250,000 to about 700,000.

13. A flexible asbestos free gasket adapted for use at elevated temperatures within the range of about 1200° F. to about 1600° F. comprising a base sheet metal and a sealant coating on the sheet metal having a thickness of about 0.3 mils to about 10 mils, said coating comprising a flexible, heat-cured, phenyl-substituted, alkyl-substituted polysiloxane resin containing at least 10 mole percent of the phenyl radical, said polysiloxane resin being cross-linked and having about 5% to about 50% by weight of aluminum powder dispersed therein, said powder having an average particle size from about 20 microns to about 70 microns.

14. The flexible gasket of claim 13 in which said polysiloxane resin contains in admixture a sufficient amount of an alkyd resin to aid in imparting said flexibility.

15. The flexible gasket of claim 13 in which said polysiloxane resin is polymethylphenylsiloxane.

16. The flexible gasket of claim 13 in which said phenyl-substituted, alkyl-substituted polysiloxane resin is formed from a polymer having the formula:

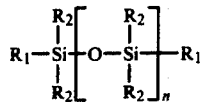

in which $R_1$ may be the same or different and is methyl, ethyl, propyl, isopropyl, vinyl, allyl, or hydroxyl, $R_2$ may be the same or different and methyl, ethyl, propyl, isopropyl, or phenyl, provided that there is at least one phenyl radical per

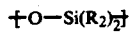

group, and n is a whole number sufficiently high to result in a solid state.

17. The flexible gasket of claim 16 in which $R_2$ substituents comprise about 50 mole percent of methyl and about 50 mole percent phenyl.

18. A process of preparing a flexible asbestos free gasket adapted for high temperature application comprising applying to a metallic base sheet a solution of a phenyl-substituted, hydrocarbyl-substituted polysiloxane resin capable of further polymerization and containing at least 10 mole percent of the phenyl radical and about 5% to about 50% by weight of metallic powder dispersed in said solution, said powder having an average particle size from about 20 microns to about 70 microns, and heating the base sheet and applied solution to cure and cross-link the polysiloxane resin as a flexible coat and to remove the solvent.

19. The process of claim 18 in which said base sheet is sheet steel.

20. The process of claim 18 comprising including with said polysiloxane resin prior to application to said sheet a sufficient amount of alkyd resin to aid in imparting said flexibility.

21. The process of claim 18 in which the metal of said metallic powder is selected from the group consisting of aluminum and zinc.

22. The process of claim 18 in which the metal powder is aluminum having an average particle size from about 30 microns to 50 microns.

23. The process of claim 18 in which said base sheet is stainless steel.

24. The process of claim 18 in which said polysiloxane resin is cross-linked and formed from the formula:

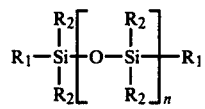

in which $R_1$ may be the same or different and is methyl, ethyl, propyl, isopropyl, vinyl, allyl, or hydroxyl, $R_2$ may be the same or different and methyl, ethyl, propyl, isopropyl, or phenyl, provided that there is at least one phenyl radical per

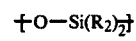

group, and n is a whole number sufficiently high to result in a solid state.

25. The process of claim 24 in which said $R_2$ substituients comprise about 50 mole percent methyl and about 50 mole percent phenyl.

* * * * *